(12) United States Patent
Ogawa

(10) Patent No.: US 8,655,088 B2
(45) Date of Patent: Feb. 18, 2014

(54) IMAGE ENCODER, IMAGE DECODER AND METHOD FOR ENCODING ORIGINAL IMAGE DATA

(75) Inventor: Takaya Ogawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 343 days.

(21) Appl. No.: 13/223,109

(22) Filed: Aug. 31, 2011

(65) Prior Publication Data

US 2012/0263389 A1    Oct. 18, 2012

(30) Foreign Application Priority Data

Apr. 15, 2011   (JP) ................................ 2011-091220

(51) Int. Cl.
*G06K 9/36* (2006.01)
*G06K 9/46* (2006.01)
(52) U.S. Cl.
USPC .......................................................... 382/236
(58) Field of Classification Search
USPC .......................... 382/233, 236, 238, 239, 248; 375/240.12, 240.16
See application file for complete search history.

(56) References Cited

U.S. PATENT DOCUMENTS

| 6,075,899 A * | 6/2000 | Yoshioka et al. .............. 382/233 |
| 2005/0169378 A1 * | 8/2005 | Kim et al. ................. 375/240.16 |
| 2006/0023954 A1 * | 2/2006 | Ishizuka et al. ............... 382/232 |
| 2008/0059716 A1 | 3/2008 | Watanabe et al. |
| 2008/0079743 A1 | 4/2008 | Watanabe et al. |
| 2008/0137754 A1 | 6/2008 | Suzumura et al. |
| 2009/0116556 A1 | 5/2009 | Ogawa |

FOREIGN PATENT DOCUMENTS

JP    2008-061156    3/2008

* cited by examiner

*Primary Examiner* — Phuoc Tran

(74) *Attorney, Agent, or Firm* — Knobbe, Martens, Olson & Bear, LLP

(57) ABSTRACT

According to one embodiment an image encoder encodes original image data using reference image data stored in a frame memory. The image encoder includes a controller, a memory, a motion controller, and a motion compensation module. The controller generates control information including a starting point coordinate and an ending point coordinate of a necessary area in the reference image data stored in the frame memory. The memory includes a storage area in which at least part of the reference image data is stored. The motion controller determines whether the necessary area is a transfer-necessary area or a transfer-unnecessary area based on the control information, and transfers the reference image data of the transfer-necessary area from the frame memory to the storage area. The motion compensation module generates prediction image data using the reference image data stored in the storage area.

20 Claims, 15 Drawing Sheets

| | PROPER INFORMATION (Vn) | | | |
|---|---|---|---|---|
| | V0 | V1 | V2 | V3 |
| VARID INFORMATION (BUFV) | 1 | 1 | 1 | 1 |
| FIRST TAG (BUFX) | 1 | 1 | 0 | 0 |
| SECOND TAG (BUFY) | 3 | 3 | 0 | 0 |
| SIZE INFORMATION (BUFH) | 13 | 13 | 16 | 16 |

FIG. 7

|   | CONDITION | RESULT OF DETERMINING AREA |
|---|---|---|
| (A) | yb > BUFY[Vn] + BUFH[Vn] -1<br>\|\| ye << BUFY[Vn] | WHOLE NECESSARY AREA IS NOT INCLUDED IN BUFFERD AREA |
| (B) | yb < BUFY[Vn]<br>&& ye > BUFY[Vn] + BUFH[Vn] -1 | NECESSARY AREA INCLUDES BUFFERD AREA |
| (C) | BUFY[Vn] <= yb <= BUFY[Vn] + BUFH[Vn] -1<br>&& ye > BUFY[Vn] + BUFH[Vn] -1 | START POINT AND ANY POINT IN NECESSARY AREA FALL WITHIN BUFFERD AREA |
| (D) | yb < BUFY[Vn]<br>&& BUFY[Vn] <= ye <= BUFY[Vn] + BUFH[Vn] -1 | ANY POINT AND END POINT IN NECESSARY AREA FALL WITHIN BUFFERD AREA |
| (E) | BUFY[Vn] <= yb <= BUFY + BUFH -1<br>ye <= BUFY[Vn] + BUFH[Vn] -1 | WHOLE NECESSARY AREA IS INCLUDED IN BUFFERD AREA |

FIG. 12

| RESULT OF DETERMINING VALIDITY | RESULT OF DETERMINING AREA | VALID INFORMATION (BUFV) | FIRST TAG (BUFX) | ECOND TAG (BUFY) | SIZE INFORMATION (BUFH) | |
|---|---|---|---|---|---|---|
| INVALID | NONE | 1 | x | yb | ye-yb+1 | |
| VALID | (A) | – | – | yb | ye-yb+1 | |
| | (B) | – | – | yb | ye-yb+1 | |
| | (C) | – | – | – | ye-BUFY[Vn]+1 | ←C1 |
| | (D) | – | – | ye-15 | 16 | ←C2 |
| | (E) | – | – | yb | min(6, BUFY[Vn]+BUFH[Vn]-yb) | |

IMAGE ENCODER, IMAGE DECODER AND METHOD FOR ENCODING ORIGINAL IMAGE DATA

CROSS REFERENCE TO RELATED APPLICATIONS

This application is based upon and claims the benefit of priority from the prior Japanese Patent Application No. 2011-091220, filed on Apr. 15, 2011, the entire contents of which are incorporated herein by reference.

FIELD

Embodiments described herein relate generally to an image encoder, an image decoder and a method for encoding original image data.

BACKGROUND

Recently an image encoder and an image decoder have been used, and these image encoder and image decoder supports a video codec in which motion compensation is used, for example the video codec is MPEG2 (Moving Picture Experts Group phase-2) or H.264.

Conventional image encoder and image decoder perform an operation of motion compensation using reference image data to generate prediction image data. The image encoder encodes original image data using the prediction image data. On the other hand, the image decoder decodes the coded data using the prediction image data. For the purpose of the operation of motion compensation, the image encoder and the image decoder store the reference image data stored in a main memory such as a dynamic random access memory (DRAM) in a cache memory, and generate the prediction image data using the reference image data stored in the cache memory.

A general cache memory includes a management area in which management information is stored and a storage area in which cache data is stored. In the cache memory, the cache data is managed in units of cache line size using the management information. The management information includes a flag indicating whether data is valid and a tag corresponding to a bit string which indicates a part of the address of cache data on the main memory.

However, because the cache data is managed in units of cache line size, data smaller than the cache line size cannot be read. Accordingly, even if a part one cache line size of data is used in the operation of motion compensation, only the part cannot be read. As a result, an occupied bandwidth of the main memory increases in reading the data.

On the other hand, an amount of management information increases when the cache line size decreases in order to reduce the occupied bandwidth. As a result, the ratio of a management area to a storage area of the cache memory increases, that is, the use efficiency of the cache memory decreases.

BRIEF DESCRIPTION OF THE DRAWINGS

FIG. 7 illustrates a data structure of the management information of the embodiment.
FIG. 12 is an explanatory view illustrating results of determining area and conditional expressions of the embodiment.
FIG. 14 is an explanatory view of updating management information of the embodiment.
FIG. 15 is an explanatory view of a specific example of the operation for transferring reference image data of the embodiment.

DETAILED DESCRIPTION

In general, according to one embodiment an image encoder encodes original image data using reference image data stored in a frame memory. The image encoder includes a controller, a memory, a motion controller, and a motion compensation module. The controller generates control information including a starting point coordinate and an ending point coordinate of a necessary area in the reference image data stored in the frame memory. The memory includes a storage area in which at least part of the reference image data is stored. The motion controller determines whether the necessary area is a transfer-necessary area or a transfer-unnecessary area based on the control information, and transfers the reference image data of the transfer-necessary area from the frame memory to the storage area. The motion compensation module generates prediction image data using the reference image data stored in the storage area.

Figure 1:
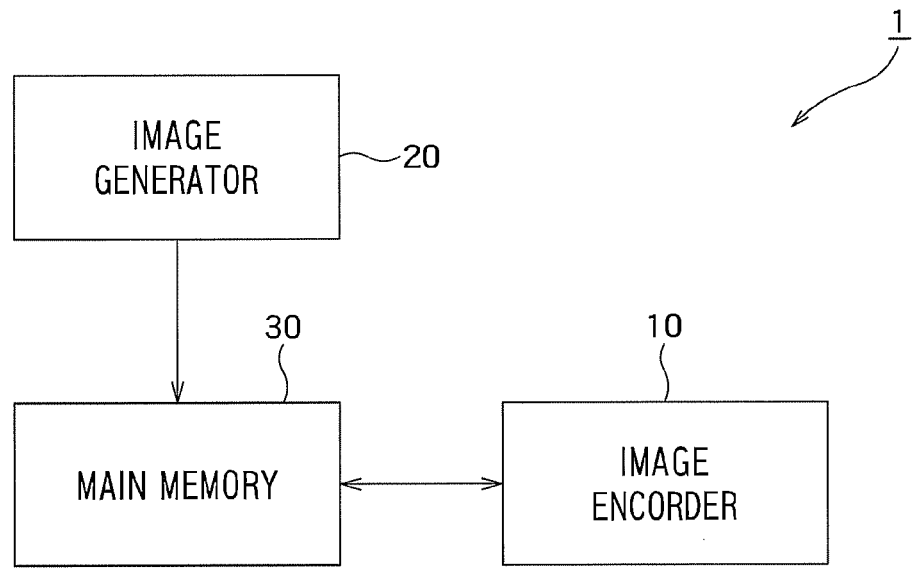
FIG. 1 is a configuration diagram of an image processing system 1 of an embodiment.

The embodiment will now be explained with reference to the accompanying drawings. FIG. 1 is a configuration diagram of an image processing system 1 of an embodiment. The image processing system 1 includes an image encoder 10, an image generator 20, and a main memory 30.

The image generator 20 generates original image data to be coded. For example, the image generator 20 is an image sensor of a digital video camera that supports a motion-compensation-based video codec such as MPEG2 and H.264. The original image data includes a maximum of 1920 by 1088 pixels. 1 pixel has 8 bits. The image encoder 10 codes the original image data stored in the main memory 30 and generates coded data. More specifically, the image encoder 10 performs coding in units of macroblock that has 16-by-16-pixels. The coding is performed in a raster scan sequence. In the raster scan sequence, the coding is horizontally performed in units of macroblock from a starting point of a line of macroblocks. When the coding is performed to all the macroblocks included in one line, the coding is horizontally performed from the starting point of the line that is vertically shifted by one. In the coding for one macroblock, the image encoder 10 codes the macroblock of the original image data using reference image data that has 24-by-24-pixels. The reference image data and the macroblock size are not limited to the embodiment, but a user can arbitrarily fix the reference image data and the macroblock size based on a encoding algorithm used in the image encoder 10. The original image data, the coded data, and the reference image data are stored in the main memory 30. For example, the main memory 30 is a DRAM.

Figure 2:
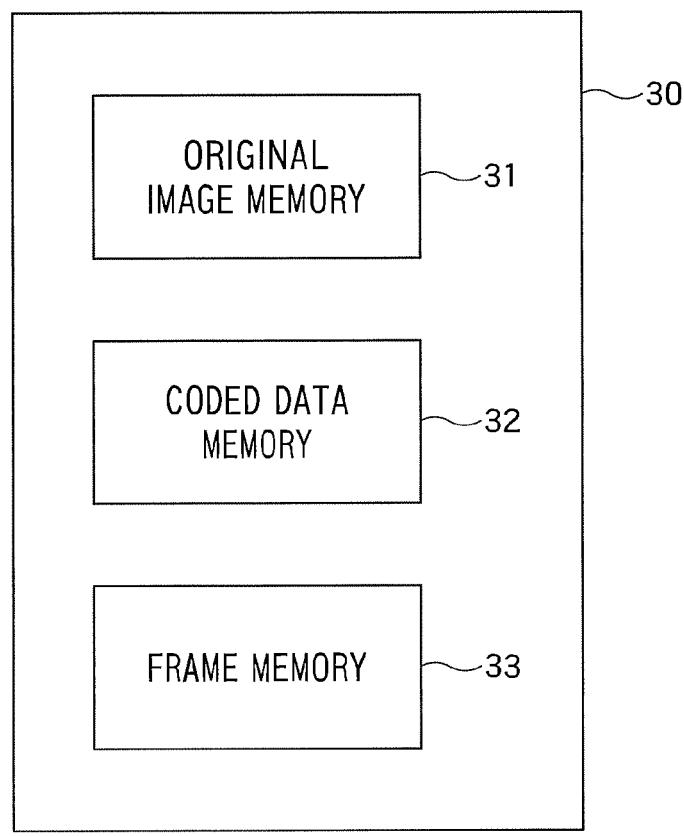
FIG. 2 is a block diagram of the main memory 30 of the embodiment.

FIG. 2 is a block diagram of the main memory 30 of the embodiment. The main memory 30 includes plural storage areas (an original image memory 31, a coded data memory 32, and a frame memory 33). The storage areas may be provided in one memory component (for example, DRAM chip), or the storage area may separately be provided in each memory component.

The original image data is stored in the original image memory 31. The coded data is stored in the coded data memory 32. The reference image data is stored in the frame memory 33 in units of word that has 8-by-2-pixels (that is, 128 bits). When the reference image data that has 24-by-24-pixel is read with a margin of 1 word, reference image data that has a maximum of 32 (=24+8)-by-26 (=24+2)-pixels read from the frame memory 33.

Figure 3:
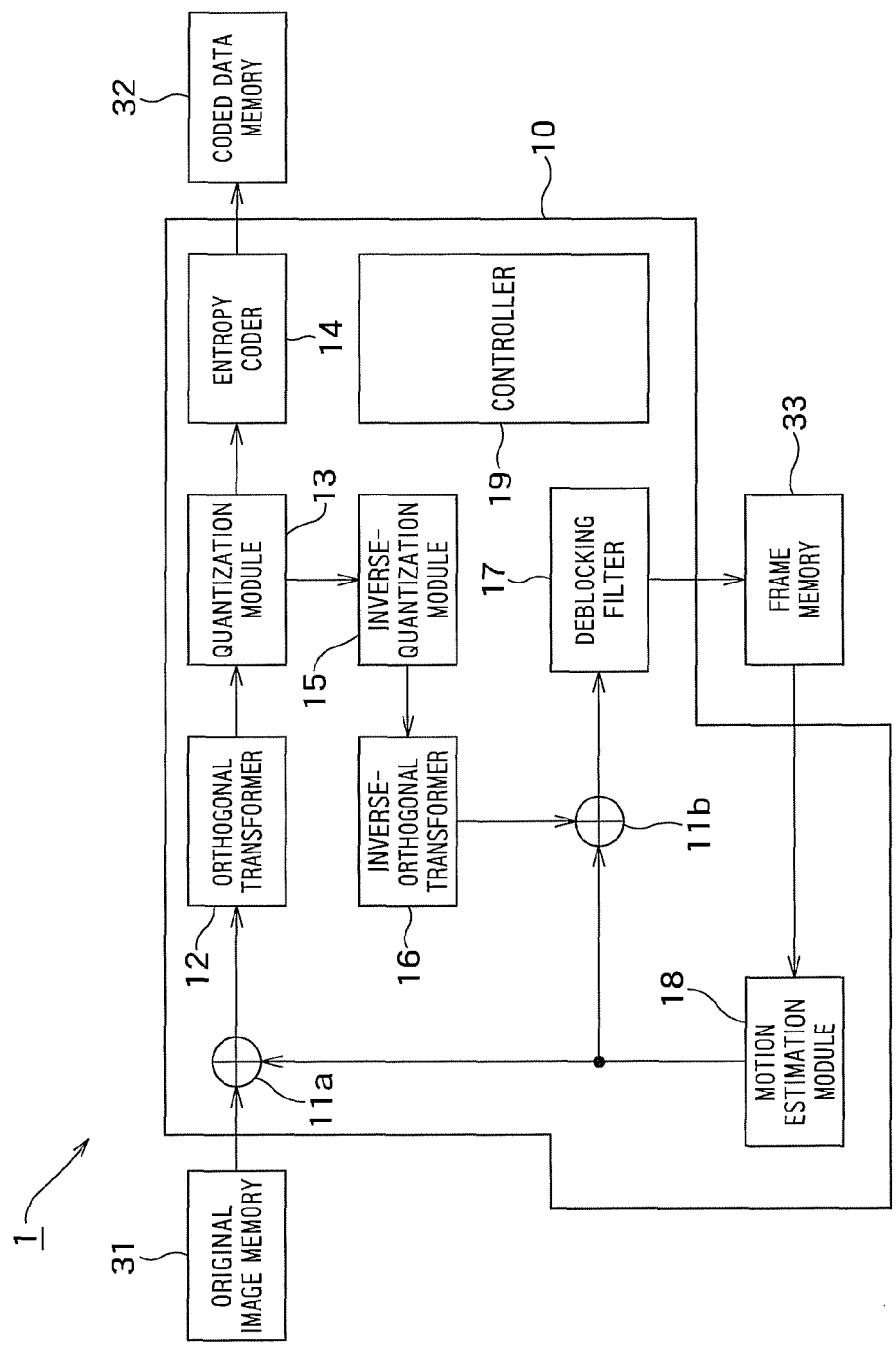
FIG. 3 is a functional block diagram of the image encoder 10 of the embodiment.

FIG. 3 is a functional block diagram of the image encoder 10 of the embodiment. The image encoder 10 includes a subtractor 11a, an adder 11b, an orthogonal transformer 12, a quantization module 13, an entropy coder 14, an inverse-quantization module 15, an inverse-orthogonal transformer 16, a deblocking filter 17, a motion estimation module 18, and a controller 19.

The subtractor 11a subtracts prediction image data that is an output of the motion estimation module 18 from the original image data to generate first residual image data. The orthogonal transformer 12 performs an orthogonal transform of the first residual image data to generate first coefficient data. For example, the orthogonal transformer 12 performs a discrete cosine transform (hereinafter referred to as "DCT") to the first residual image data. The quantization module 13 quantizes the first coefficient data to generate quantized data. The entropy coder 14 codes the quantized data to generate coded data. For example, the entropy coder 14 codes the quantized data using variable-length coding.

The inverse-quantization module 15 inversely quantizes the quantized data to generate second coefficient data. The second coefficient data is values including quantization errors in the quantization module 13 and the inverse-quantization module 15. The inverse-orthogonal transformer 16 performs an inverse-orthogonal transform of the second coefficient data to generate second residual image data. Similarly to the second coefficient data, the second residual image data is values containing quantization errors corresponding to the first residual image data. The adder 11b adds the prediction image data to the second residual image data to generate locally-decoded image data. The deblocking filter 17 smooths a block boundary of the locally-decoded image data to generate the reference image data. The controller 19 controls the whole image encoder 10 while controlling access to the original image memory 31, the coded data memory 32, and the frame memory 33. Therefore, the reference image data is stored in the frame memory 33.

Figure 4:
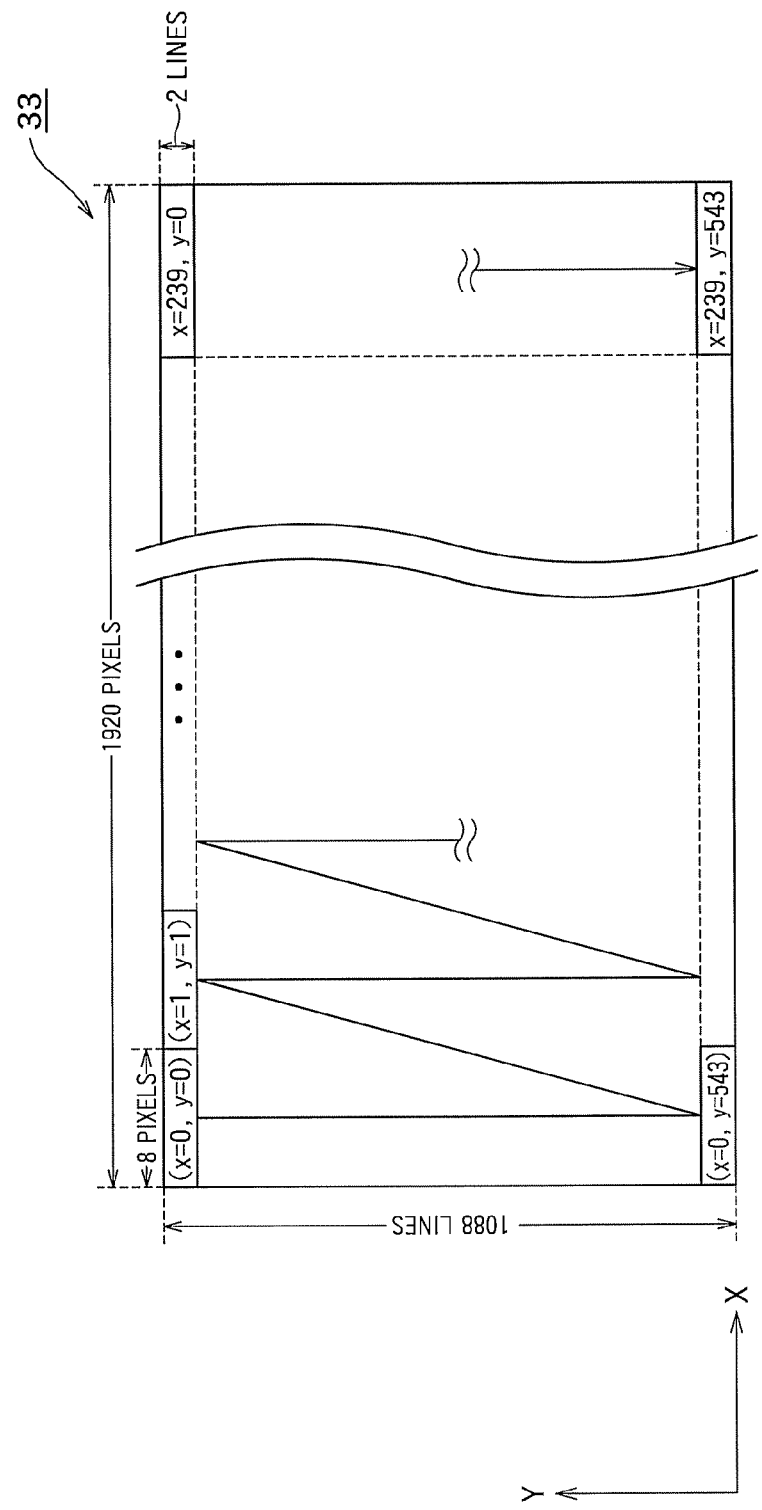
FIG. 4 is an explanatory view illustrating an addressing structure of the frame memory 33 of the embodiment.

FIG. 4 is an explanatory view illustrating an addressing structure of the frame memory 33 of the embodiment. The reference image data having the same size (that is, 1920 by 1088 pixels) as one frame of image data can be stored in the frame memory 33 in units of word. 1 word has 128 bits. A coordinate (x,y) indicating a position of the reference image data on the frame memory 33 is assigned to each word. That is, a coordinate x in an X-direction is assigned in each 8 pixels, and a coordinate y in a Y-direction is assigned in each two pixels. The coordinate x ranges from 0 to 239, the coordinate y ranges from 0 to 543. In FIG. 4, 1 pixel is expressed by single component of 8 bits. However, the scope of the invention is not limited to the pixel expressed by the 8-bit single component. Even if the 1 pixel is expressed by plural components such as a luminance and color-difference (YCbCr) signal and an RGB signal, the invention can be applied by allocating an independent frame memory to each component.

Figure 5:
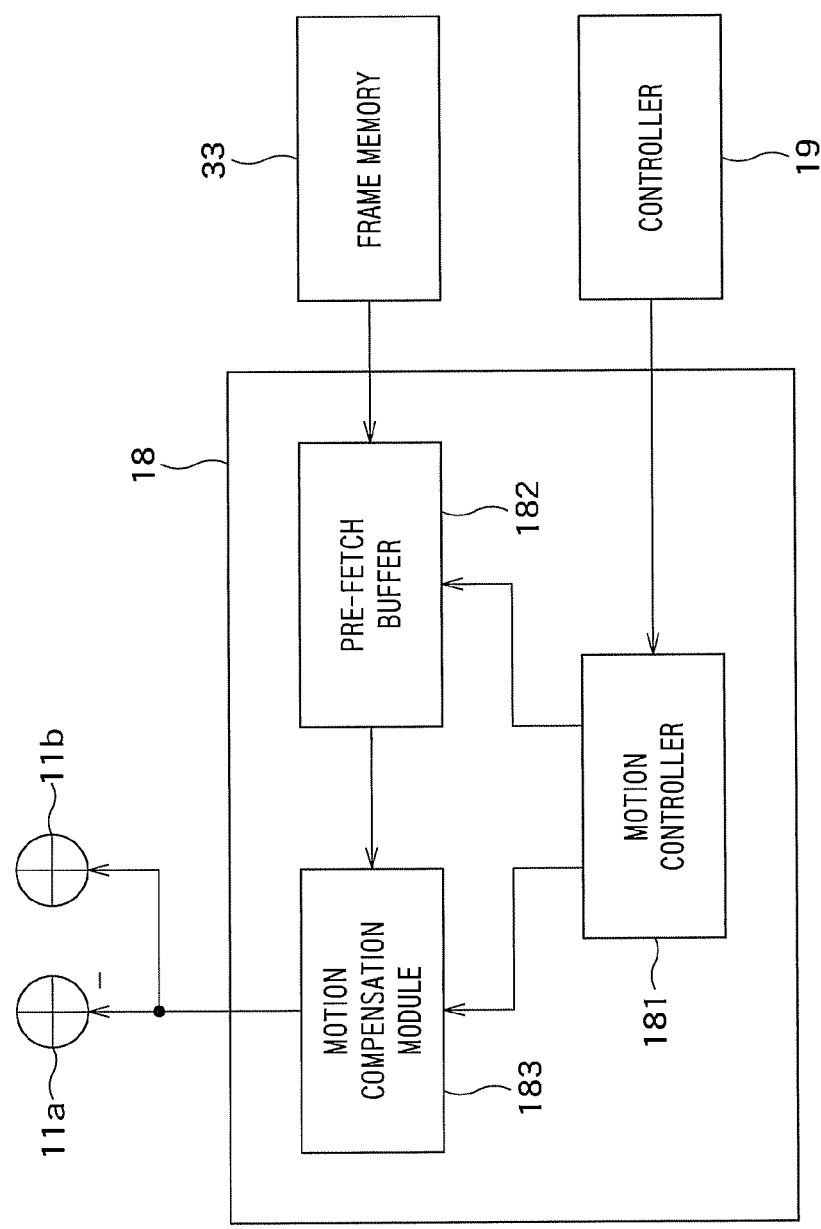
FIG. 5 is a configuration diagram of the motion estimation module 18 of the embodiment.

The motion estimation module 18 performs an operation of motion compensation to the reference image data to generate the prediction image data. FIG. 5 is a configuration diagram of the motion estimation module 18 of the embodiment. The motion estimation module 18 includes a motion controller 181, a pre-fetch buffer 182, and a motion compensation module 183.

The motion controller 181 controls the whole motion estimation module 18. The reference image data necessary to generate the prediction image data is stored in the pre-fetch buffer 182. For example, the pre-fetch buffer 182 is a static random access memory (SRAM). The motion compensation module 183 generates the prediction image data using the reference image data stored in the pre-fetch buffer 182 and the motion compensation module 183 outputs the prediction image data to the subtractor 11a and the adder 11b.

In the operation of motion compensation, the controller 19 generates control information to specify storage area (hereinafter referred to as a "necessary area") on the frame memory 33, in which the reference image data which is needed to generate the prediction image data is stored. The control information includes a starting point coordinate (xb,yb) and an ending point coordinate (xe,ye) of the necessary area. The necessary area is a rectangular area bounded by the starting point coordinate (xb,yb) and the ending point coordinate (xe,ye).

The motion controller 181 transfers the reference image data stored in the frame memory 33 to the pre-fetch buffer 182 based on the control information. The motion controller 181 registers management information in the pre-fetch buffer 182 to manage the transferred reference image data. The motion controller 181 controls the motion compensation module 183 such that the motion compensation module 183 performs the operation of motion compensation to the reference image data stored in the pre-fetch buffer 182. Thereby, the prediction image data is generated.

Figure 6:
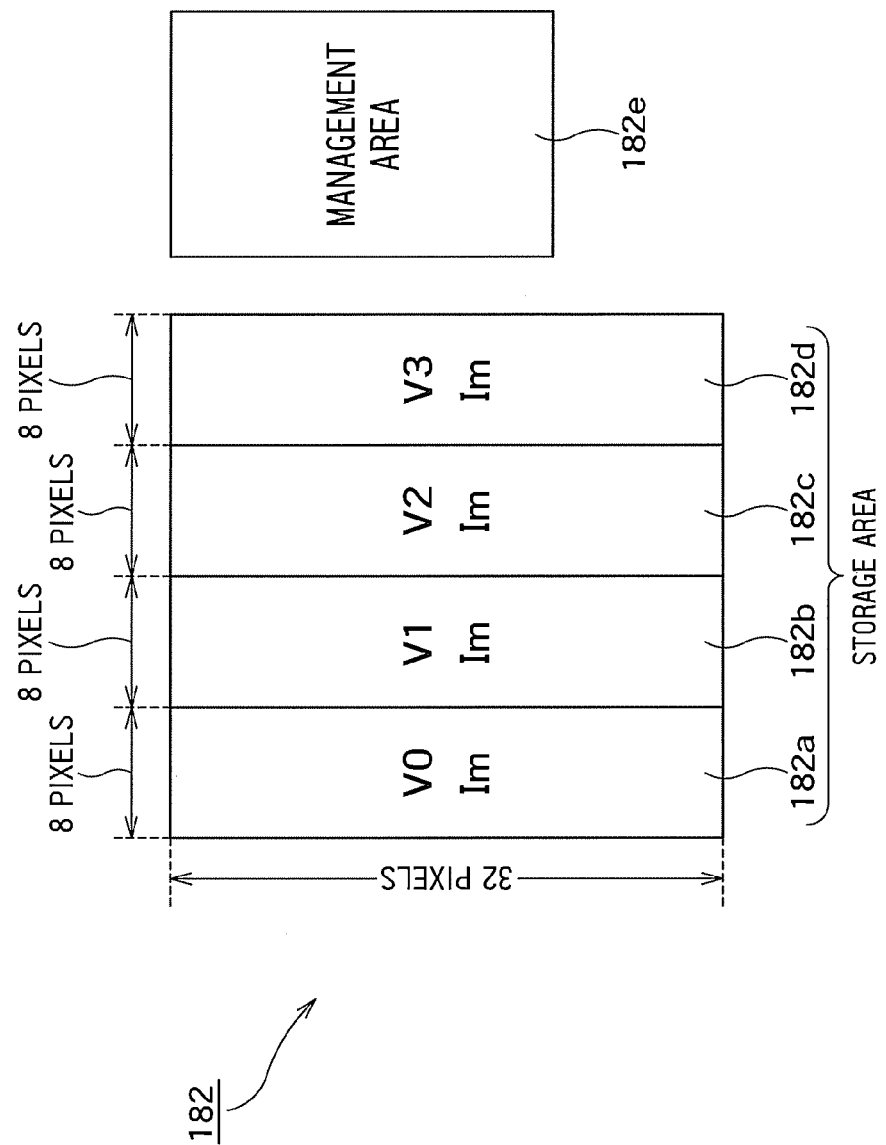
FIG. 6 is a configuration diagram of the pre-fetch buffer 182 of the embodiment.

FIG. 6 is a configuration diagram of the pre-fetch buffer 182 of the embodiment. The pre-fetch buffer 182 includes plural storage areas (first to fourth storage areas 182a to 182d in FIG. 6) and a management area 182e. Each storage area has a capacity (a capacity corresponding to 16 words (256 bytes) on the frame memory 33) in which the reference image data having the 8 pixels in the X-direction and the 32 pixels in the Y-direction can be stored. That is, the reference image data including the capacity (corresponding to 64 words (1024 bytes) on the frame memory 33) having the 32 pixels in the X-direction and the 32 pixels in the Y-direction can be stored in the plural storage areas. The management information is stored in the management area 182e.

Proper information Vn (n is an integer of 0 to 3) and an index Im (m is an integer of 0 to 15) are assigned to each storage area. The proper information Vn is a name that specifies each storage area. The pieces of proper information V0 to V3 correspond to first to fourth storage areas 182a to 182d, respectively. The index Inn is information that correlates the reference image data stored in each storage area with the reference image data stored in the frame memory 33.

FIG. 7 illustrates a data structure of the management information of the embodiment. The management information includes valid information (BUFV), a first tag (BUFX), a second tag (BUFY), and size information (BUFH) in each of the pieces of proper information V0 to V3. The valid information is binary data indicating whether the reference image data is stored in each storage area. For example, valid information "1" indicates that the reference image data is stored (that is, the storage area is valid), and valid information "0" indicates that the reference image data is not stored (that is, the storage area is invalid). The first tag indicates a starting point X-coordinate (first starting point coordinate) of the reference image data on the frame memory 33. The second tag indicates a starting point Y-coordinate (second starting point coordinate) of the reference image data on the frame memory 33. That is, the first and second tags indicate the coordinate from where the reference image data stored in each storage area is read in the frame memory 33. The size information indicates a size of the reference image data. For example, the management information "(BUFV,BUFX,BUFY,BUFH)= (1,1,3,13)" on the proper information V0 means that the reference image data stored in the first storage area 182a is read from a 13-word rectangular area having a starting point (1,3) on the frame memory 33. Furthermore, initial values of the valid information, the first and second tags, and the size information are set to 0.

Figure 8:
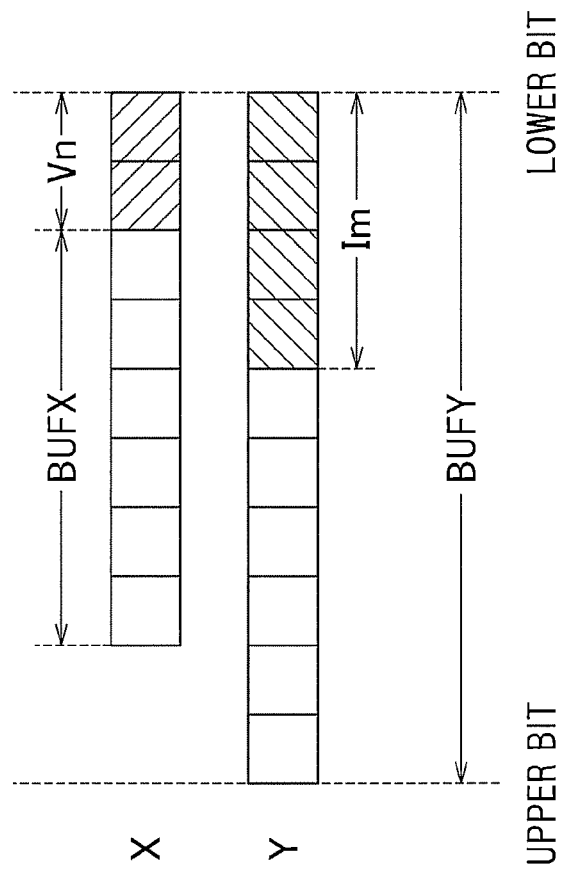
FIG. 8 is an explanatory view of mapping of the embodiment.

FIG. 8 is an explanatory view of mapping of the embodiment. The X-coordinate is expressed by an 8-bit bit string, and the Y-coordinate is expressed by a 10-bit bit string. The motion controller 181 registers 2 lower bits of the X-coordinate in the proper information Vn and registers 6 upper bits in the first tag. The motion controller 181 correlates 4 lower bits of the Y-coordinate with the index Inn and registers the whole 10 bits in the second tag. That is, the motion controller 181 generates the management information using the coordinate on the frame memory 33. Thereby, the reference image data stored in the pre-fetch buffer 182 is correlated with the reference image data stored in the frame memory 33.

Figure 9:
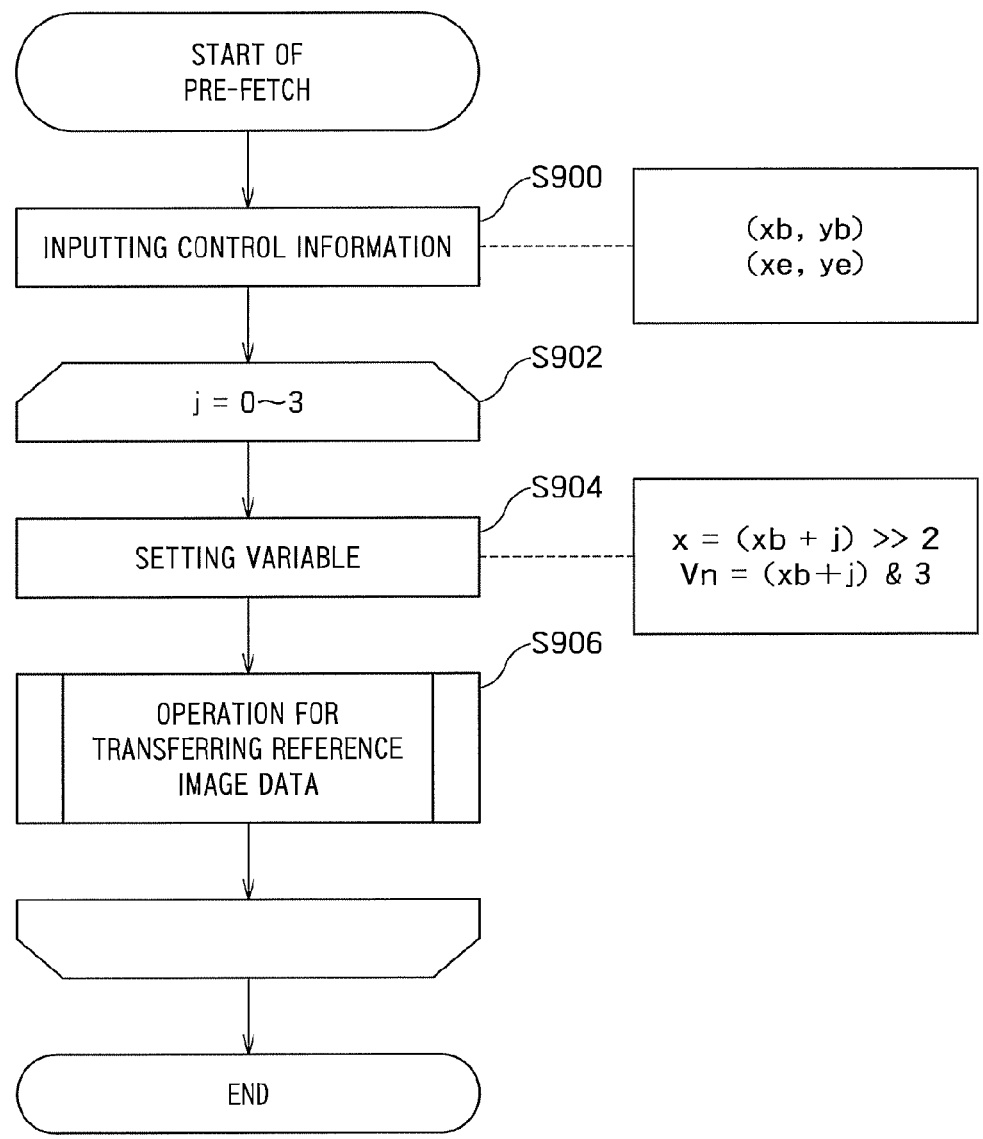
FIG. 9 is a flowchart of pre-fetch of the embodiment.

An operation performed by the motion controller 181 of the embodiment will be explained below. FIG. 9 is a flowchart of pre-fetch of the embodiment. The motion controller 181 performs pre-fetch to transfer the reference image data stored in the frame memory 33 to the pre-fetch buffer 182.

The motion controller 181 inputs the control information from the controller 19 (S900). The motion controller 181 specifies the rectangular area bounded by the starting point coordinate (xb,yb) and the ending point coordinate (xe,ye) as the necessary area. The motion controller 181 sets a loop variable j (S902). The initial value of the loop variable j is set to 0. The loop variable j indicates the storage area corresponding to the proper information Vn, which is of a storage destination of the reference image data. For example, for j=0, the first storage area 182a corresponding to the proper information V0 is the storage destination of the reference image data. The loop variable j is incremented every time S906 is ended, and S904 and S906 are repeated up to the number of storage areas (j=3 in FIG. 6).

The motion controller 181 sets the variables x and Vn dealt with in the pre-fetch (S904). More specifically, the motion controller 181 sets "(xb+j)>>2" to the variable x and set "(xb+j)&3" to the variable Vn. At this point, "(xb+j)>>2" means a quotient of a sum of the starting point X-coordinate xb and the loop variable j divided by 4, and "(xb+j)&3" means a remainder of the sum of the starting point X-coordinate xb and the loop variable j divided by 4.

Figure 10:
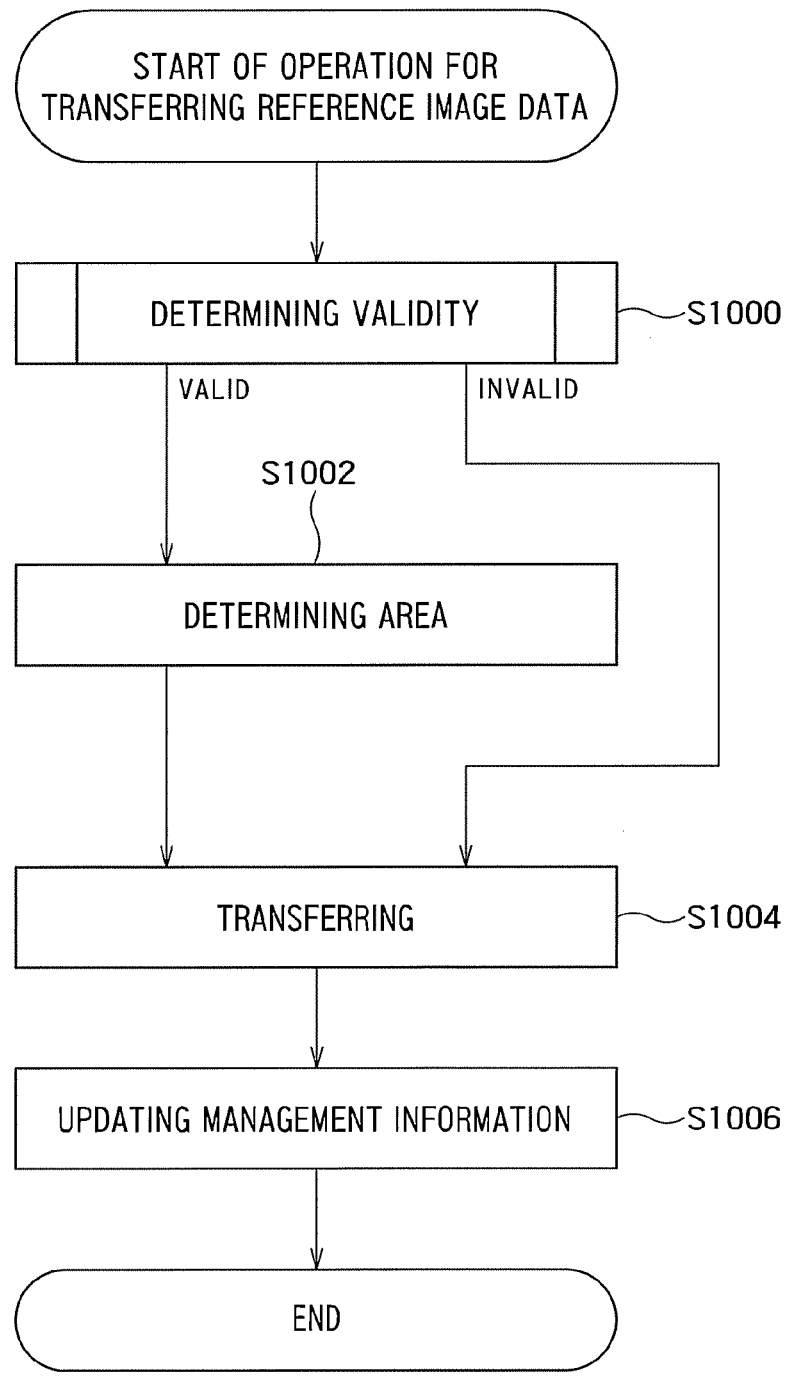
FIG. 10 is a flowchart of the operation for transferring reference image data of the embodiment.

The motion controller 181 performs an operation for transferring reference image data to transfer the reference image data stored in the frame memory 33 to the pre-fetch buffer 182 (S906). FIG. 10 is a flowchart of the operation for transferring reference image data of the embodiment.

Figure 11:
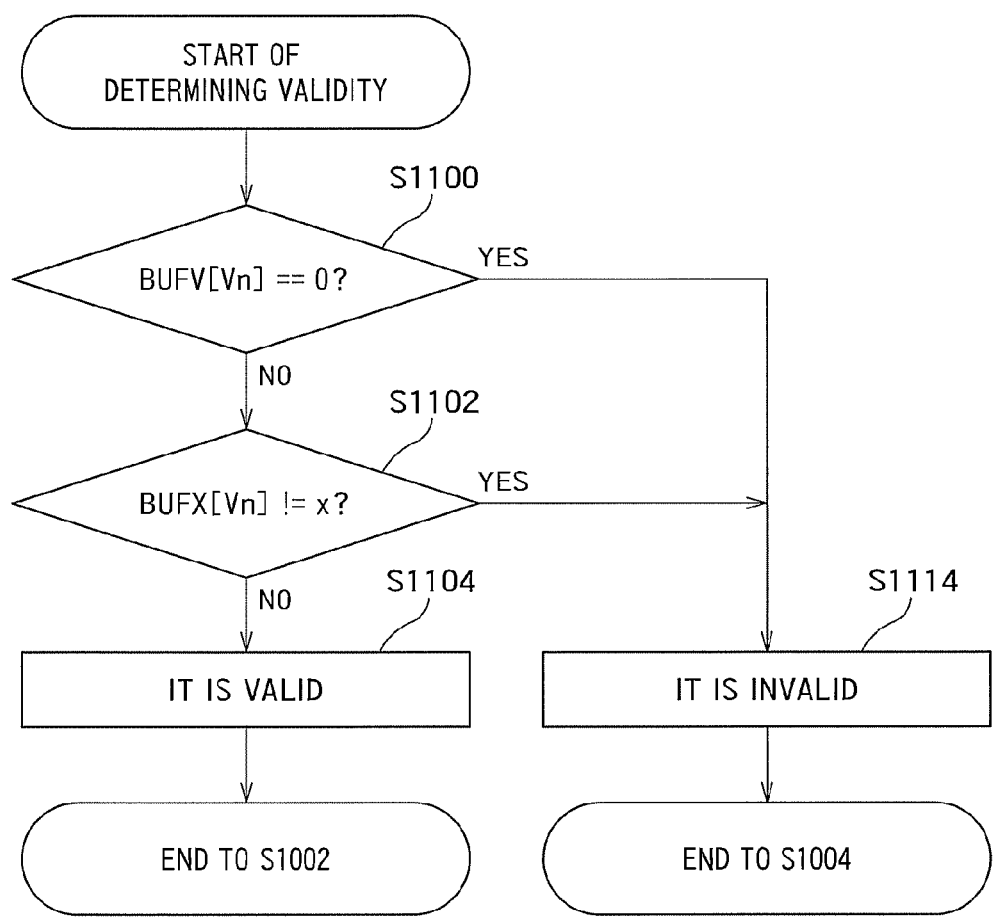
FIG. 11 is a flowchart of determining validity of the embodiment.

The motion controller 181 determines whether the reference image data is stored in the pre-fetch buffer 182 (that is, whether the storage area of the pre-fetch buffer 182 is valid) based on the control information and the management information (S1000). FIG. 11 is a flowchart of determining validity of the embodiment.

When neither a first valid condition that "valid information BUFV[Vn] of the management information is 0" nor a second valid condition that "a first tag BUFX[Vn] of the management information differs from the variable x" are satisfied (NO in S1100 and NO in S1102), the motion controller 181 determines that the storage area corresponding to the proper information Vn is valid (S1104). Then the flow goes to S1002. On the other hand, when at least one of the first and second valid conditions is satisfied (YES in S1100 or YES in S1102), the motion controller 181 determines that the storage area corresponding to the proper information Vn is invalid (S1114). Then the flow goes to S1004.

The motion controller 181 determines whether the reference image data necessary to generate the prediction image data is stored in the pre-fetch buffer 182 based on the control information and the management information (S1002). FIG. 12 is an explanatory view illustrating results of determining area and conditional expressions of the embodiment. The motion controller 181 determines whether each conditional expression holds in the order of conditional expressions (A) to (E). When the conditional expression holds, the results of determining area is classified into (A) "no necessary area is included in a buffered area", (B) "the necessary area includes the whole buffered area", (C) "an area from the starting point to certain point of the necessary area are included in the buffered area", (D) "an area from certain point to the ending point of the necessary area is included in the buffered area", and (E) "the whole necessary area is included in the buffered area". As used herein, the buffered area means an area on the frame memory 33, in which the reference image data is already stored before S1002. FIGS. 13A to 13E are conceptual views of the results of determining area of the embodiment.

Figure 13A:
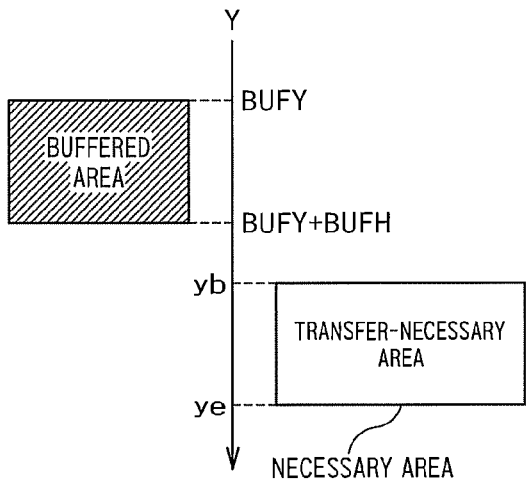
FIG. 13A to 13E are conceptual views of the results of determining area of the embodiment.

The area determination result (A) means that the whole necessary area is a transfer-necessary area to be transferred. For example, as illustrated in FIG. 13A, the area determination result (A) corresponds to the case in which the starting point Y-coordinate yb of the necessary area is larger than an ending point Y-coordinate "BUFY+BUFH−1" of the buffered area or the case in which the ending point Y-coordinate ye of the necessary area is lower than the starting point Y-coordinate BUFY of the buffered area.

Figure 13B:
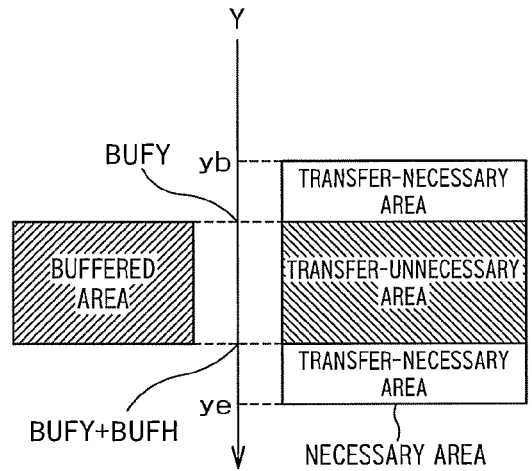

The area determination result (B) means that the necessary area is divided into two transfer-necessary areas and a transfer-unnecessary area between the two transfer-necessary areas. For example, as illustrated in FIG. 13B, the area determination result (B) corresponds to the case in which the starting point Y-coordinate yb of the necessary area is lower than the starting point Y-coordinate BUFY of the buffered area while the ending point Y-coordinate ye of the necessary area is larger than the ending point Y-coordinate "BUFY+BUFH−1" of the buffered area. The transfer-necessary area includes an area (including boundaries) from the starting point Y-coordinate yb of the necessary area (including the starting point Y-corrdinate yb of the necessary area) to immediately above the starting point Y-coordinate BUFY of the buffered area, and an area (including boundaries) from immediately below the ending point Y-coordinate "BUFY+BUFH−

1" of the buffered area to the ending point Y-coordinate ye of the necessary area. The transfer-unnecessary area is an area bounded by the starting point Y-coordinate BUFY and the ending point Y-coordinate "BUFY+BUFH−1" of the buffered area.

Figure 13C:
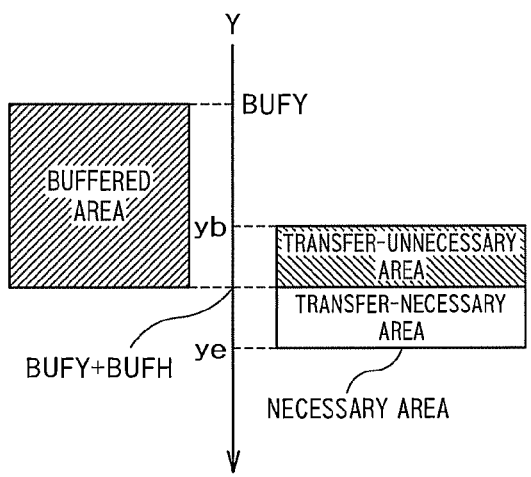

The area determination result (C) means that the necessary area is divided into the transfer-necessary area on the larger Y-coordinate side and the transfer-unnecessary area on the smaller Y-coordinate side. For example, as illustrated in FIG. 13C, the area determination result (C) corresponds to the case in which the starting point Y-coordinate yb of the necessary area falls within a range (including boundaries) from the starting point Y-coordinate BUFY of the buffered area to the ending point Y-coordinate "BUFY+BUFH−1" of the buffered area while the ending point Y-coordinate ye of the necessary area is larger than the ending point Y-coordinate "BUFY+BUFH−1" of the buffered area. The transfer-necessary area includes only an area (including boundaries) from immediately below the ending point Y-coordinate "BUFY+BUFH−1" of the buffered area to the ending point Y-coordinate ye of the necessary area. The transfer-unnecessary area includes an area (including boundaries) from the starting point Y-coordinate yb of the necessary area to the ending point Y-coordinate "BUFY+BUFH−1" of the buffered area.

Figure 13D:
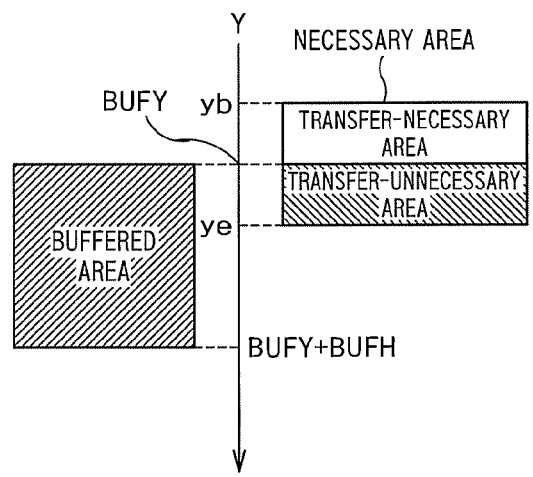

The area determination result (D) means that the necessary area is divided into the transfer-necessary area on the smaller Y-coordinate side and the transfer-unnecessary area on the larger Y-coordinate side. For example, as illustrated in FIG. 13D, the area determination result (D) corresponds to the case in which the starting point Y-coordinate yb of the necessary area is lower than the starting point Y-coordinate "BUFY" of the buffered area while the ending point Y-coordinate ye of the necessary area falls within a range (including boundaries) from the starting point Y-coordinate "BUFY" of the buffered area to the ending point Y-coordinate "BUFY+BUFH−1" of the buffered area. The transfer-necessary area includes only an area (including boundaries) from the starting point Y-coordinate yb of the necessary area to immediately above the starting point Y-coordinate BUFY of the buffered area. The transfer-unnecessary area includes an area (including boundaries) from the starting point Y-coordinate BUFY of the buffered area to the ending point Y-coordinate ye of the necessary area.

Figure 13E:
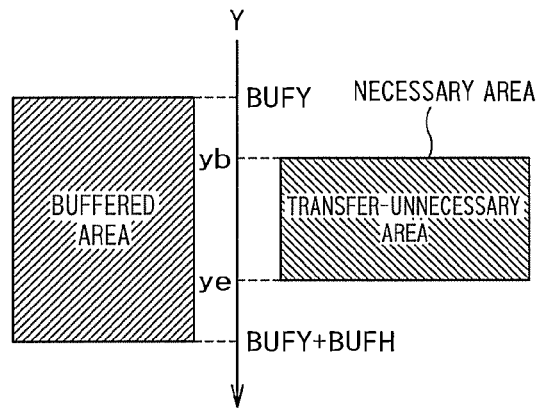

The area determination result (E) means that the whole necessary area is the transfer-unnecessary area. For example, as illustrated in FIG. 13E, the area determination result (E) corresponds to the case in which the starting point Y-coordinate yb of the necessary area falls within a range (including boundaries) from the starting point Y-coordinate "BUFY" of the buffered area to the ending point Y-coordinate "BUFY+BUFH−1" while the ending point Y-coordinate ye of the necessary area is equal to or less than the ending point Y-coordinate "BUFY+BUFH−1" of the buffered area.

The motion controller 181 transfers the reference image data, which corresponds to the transfer-necessary area, stored in the frame memory 33 to the pre-fetch buffer 182 based on the area determination result (S1004). More specifically, the motion controller 181 transfers the whole necessary area for the invalid determination (S1114) or the area determination result (A), and the motion controller 181 transfers the transfer-necessary area in the necessary area for the results of determining area (B) to (D). For the area determination result (E), S1004 is skipped. That is, the motion controller 181 does not evenly transfer the whole necessary area, but the motion controller 181 transfers the transfer-necessary area that is not stored in the pre-fetch buffer 182 without transferring the transfer-unnecessary area that is already stored in the pre-fetch buffer 182 in accordance with determining validity and determining area. Therefore, overhead of the reference image data transferred from the frame memory 33 to the pre-fetch buffer 182 is resolved.

The motion controller 181 updates the management information stored in the management area 182e based on the results of determining validity and determining area (S1006). FIG. 14 is an explanatory view of updating management information of the embodiment. When the validity determination result is invalid, the motion controller 181 registers 1 in the valid information BUFV, registers the variable x in the first tag BUFX, registers the starting point Y-coordinate yb of the necessary area in the second tag BUFY, and registers a size "ye−yb+1" of the whole necessary area in the size information BUFH. On the other hand, when the validity determination result is valid, the motion controller 181 updates the management information according to the area determination result. Because the valid information BUFV is already set to "1" when the validity determination result is valid, the updates of the valid information BUFV and the first tag BUFX can be eliminated. For the area determination result (E), because the reference image data is not transferred, the update of the management information can be eliminated.

For the area determination result (A) or (B), the motion controller 181 registers the starting point Y-coordinate yb of the necessary area in the second tag BUFY and registers a size in the Y-direction of the whole transfer-necessary area (hereinafter referred to as a "transfer-necessary area size"), "ye−yb+1", in the size information BUFH.

For the area determination result (C), the motion controller 181 updates the management information according to a total size in the Y-direction of the transfer-unnecessary area and the transfer-necessary area (hereinafter referred to as a "total area size"), "ye−BUFY[Vn]+1". It is case (C1) that when the total area size "ye−BUFY[Vn]+1" is equal to or less than a size in the Y-direction of the first to fourth storage areas 182a to 182d (hereinafter referred to as a "storage area size") "16", the motion controller 181 registers the total area size "ye−BUFY[Vn]+1" in the size information BUFH. On the other hand, it is case (C2) that when the total area size "ye−BUFY[Vn]+1" is larger than the storage area size "16", the motion controller 181 registers a difference "ye−15" between the ending point Y-coordinate of the necessary area and the storage area size in the second tag BUFY and registers the storage area size "16" in the size information BUFH.

For the area determination result (D), the motion controller 181 registers the starting point Y-coordinate yb of the necessary area in the second tag BUFY and registers smaller one of the total area size "BUFY[Vn]+BUFH[Vn]−yb" and the storage area size "16" in the size information BUFH. When the total area size "BUFY[Vn]+BUFH[Vn]−yb" is lower than the storage area size "16", the whole transfer-unnecessary area and the whole transfer-necessary area are maintained valid. On the other hand, when the total area size "BUFY[Vn]+BUFH[Vn]−yb" is equal to or larger than the storage area size "16", a part whose size in the Y-direction is larger than 16 in the transfer-unnecessary area becomes invalid in order descending Y-coordinate.

Figure 15:
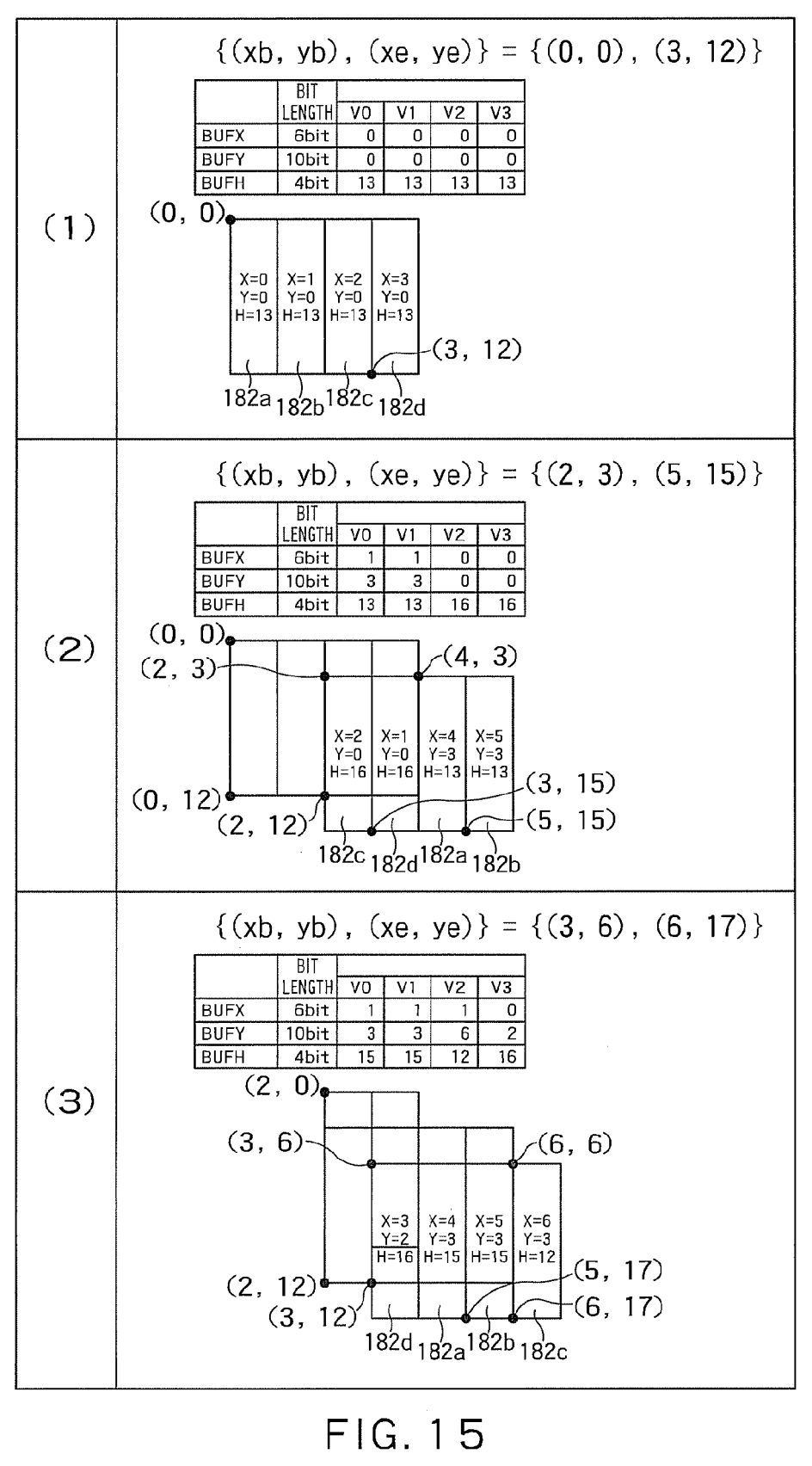

A specific example of the operation for transferring reference image data will be explained below. FIG. 15 is an explanatory view of a specific example of the operation for transferring reference image data of the embodiment. In FIG. 15, (1) corresponds to the area determination result (A), and (2) and (3) correspond to the area determination result (C).

The coding (1) is performed to the first macroblock. Before the coding is started to the first macroblock (that is, in initial state), the reference image data is not stored in the first to fourth storage areas 182a to 182d. First the controller 19 generates a control signal including the starting point coordinate (0,0) and the ending point coordinate (3,12) of the necessary area. The motion controller 181 transfers the reference image data of the whole necessary areas (0,0) to (3,12) from the frame memory 33 to the pre-fetch buffer 182. Then the motion controller 181 registers "1" in the pieces of valid information BUFV[V0] to BUFV[V3] and registers the transfer-necessary area size "13" in the pieces of size information BUFH[V0] to BUFH[V3].

Coding (2) is performed to the second macroblock. First the controller 19 generates a control signal including the starting point coordinate (2,3) and the ending point coordinate (5,15). Therefore, the starting point of the necessary area is shifted by 16 pixels in the X-direction and by 6 pixels in the Y-direction. The motion controller 181 transfers part of the reference image data of the necessary areas (2,3) to (5,15) from the frame memory 33 to the pre-fetch buffer 182. The transfer-necessary areas for the first and second storage areas 182a and 182b are the whole necessary areas (4,3) to (5,15). On the other hand, the transfer-necessary areas for the third and fourth storage areas 182c and 182d are the areas (2,13) to (3,15) where the transfer-unnecessary area is excluded from the necessary area. Then the motion controller 181 registers "1" in the first tags BUFX[V0] and BUFX[V1], registers "3" in the second tags BUFY[V0] and BUFY[V1], and registers "13" that is of the same value as the previous coding (1) in the pieces of size information BUFH[V0] and BUFH[V1]. On the other hand, although the motion controller 181 registers the total area size "16" in the pieces of size information BUFH[V2] and BUFH[V3], the motion controller 181 does not update the first tags BUFX[V2] and BUFX[V3] and the second tags BUFY[V2] and BUFY[V3].

Coding (3) is performed to the third macro block. First the controller 19 generates a control signal including the starting point coordinate (3,6) and the ending point coordinate (6,17). Therefore, the starting point of the necessary area is shifted by 8 pixels in the X-direction and by 6 pixels in the Y-direction. The motion controller 181 transfers part of the reference image data of the necessary areas (3,6) to (6,17) from the frame memory 33 to the pre-fetch buffer 182. The transfer-necessary areas for the fourth, first, and second storage areas 182d, 182a, and 182b are the areas (3,13) to (5,17) where the transfer-unnecessary area is excluded from the necessary area. On the other hand, the transfer-necessary area of the third storage area 182c is the whole necessary areas (6,6) to (6,17). Then the motion controller 181 registers "2" in the second tag BUFY[V3], registers the total area size "15" in the pieces of size information BUFH[V0] and BUFH[V1], and registers "16" that is of the same value as the previous coding (2) in the size information BUFH[V3]. On the other hand, the motion controller 181 registers "1" in the first tag BUFX[V2], registers "6" in the second tag BUFY[V2], and registers the transfer-necessary area size "12" in the size information BUFH[V2].

In a general cache memory, for example, the cache memory has the capacity of 1024 bytes, the line size of 16 bytes, and the number of cache lines of 64 (=1024±16) lines. In such cases, even if the management area per line is 2 bits, it is necessary that the management area have the capacity exceeding 80 bits. That is, because the valid bit and the necessary tag information are necessary in the management area of the cache memory, it is necessary that the management area have the extremely large capacity.

On the other hand, according to the embodiment, the motion estimation module 18 transfers the minimum reference image data from the frame memory 33 to the pre-fetch buffer 182 in accordance with a given operation sequence defined by the video codec. Specifically, a transfer amount of the embodiment is equal to the case in which the line size of the general cache memory is set to only 16 bytes. At this point, it is not necessary to excessively secure the capacity of the management area 182e. Thereby, the use efficiency of the bandwidth of the main memory 30 can be improved using the pre-fetch buffer 182 having the minimum capacity. For example, when each of the first to fourth storage areas 182a to 182d has the capacity of 1024 bytes, it is only necessary for the management area 182e to have the capacity of 80 bits.

Figure 16:
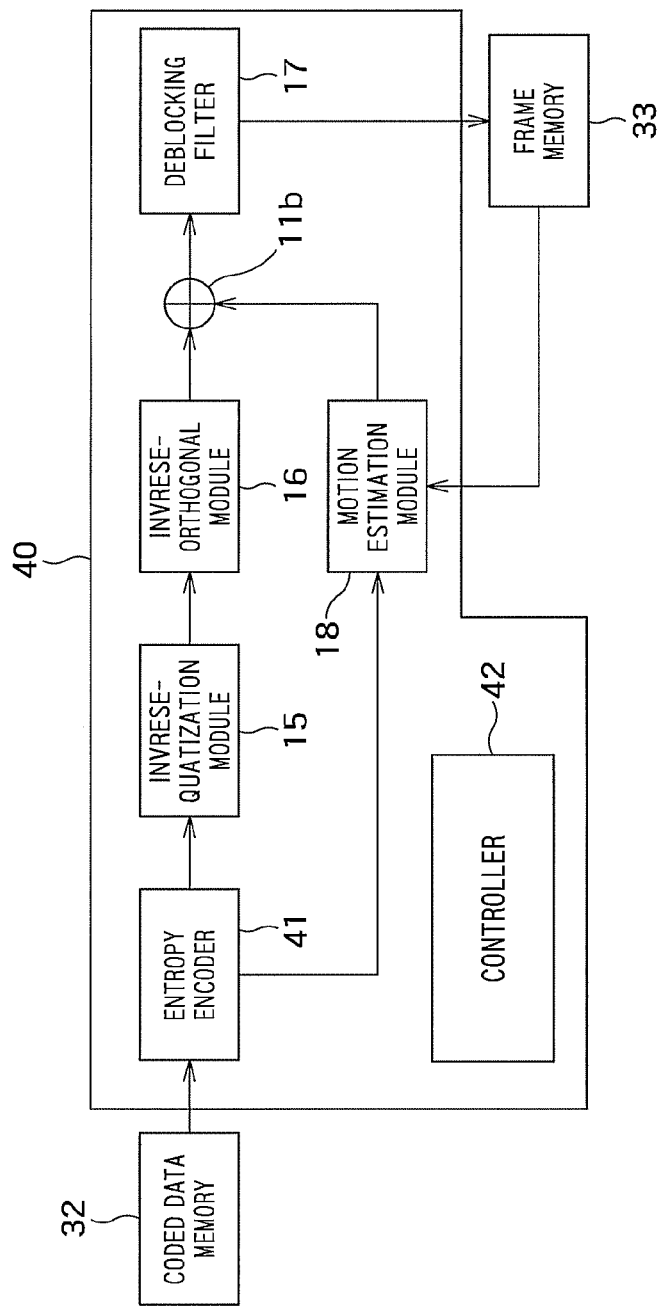
FIG. 16 is a functional block diagram of an image decoder 40 of a modification of the embodiment.

A modification of the embodiment will be explained below. FIG. 16 is a functional block diagram of an image decoder 40 of a modification of the embodiment. The image decoder 40 includes an entropy decoder 41, the inverse-quantization module 15, the inverse-orthogonal transformer 16, the adder 11b, the deblocking filter 17, the motion estimation module 18, and a controller 42. The entropy decoder 41 decodes the coded data stored in the coded data memory 32 and generates the quantized data. The controller 42 controls the whole image decoder 40 while controlling access to the coded data memory 32 and the frame memory 33. The configuration of the image decoder 40 is similar to that of the image encoder 10 except the entropy decoder 41 and the controller 42 (that is, the inverse-quantization module 15, the inverse-orthogonal transformer 16, the adder 11b, the deblocking filter 17, and the motion estimation module 18 of the image decoder 40 are the same as those of the image encoder 10).

According to the modification of the embodiment, the image decoder 40 includes the motion estimation module 18. Thereby, as the image encoder 10, the use efficiency of the bandwidth of the main memory 30 can be improved in the image decoder 40.

At least a portion of an image encoder and an image decoder according to the above-described embodiments may be composed of hardware or software. When at least a portion of the image encoder and the image decoder is composed of software, a program for executing at least some functions of the image encoder and the image decoder may be stored in a recording medium, such as a flexible disk or a CD-ROM, and a computer may read and execute the program. The recording medium is not limited to a removable recording medium, such as a magnetic disk or an optical disk, but it may be a fixed recording medium, such as a hard disk or a memory.

In addition, the program for executing at least some functions of the image encoder and the image decoder according to the above-described embodiment may be distributed through a communication line (which includes wireless communication) such as the Internet. In addition, the program may be encoded, modulated, or compressed and then distributed by wired communication or wireless communication such as the Internet. Alternatively, the program may be stored in a recording medium, and the recording medium having the program stored therein may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An image encoder configured to encode original image data using reference image data stored in a frame memory, the image encoder comprising:
a controller configured to generate control information comprising a starting point coordinate and an ending point coordinate of a necessary area in the reference image data stored in the frame memory;
a memory comprising a storage area in which at least part of the reference image data is stored;
a motion controller configured to determine whether the necessary area is a transfer-necessary area or a transfer-unnecessary area based on the control information, and transfer the reference image data of the transfer-necessary area from the frame memory to the storage area; and
a motion compensation module configured to generate prediction image data using the reference image data stored in the storage area.

2. The image encoder of claim 1, wherein the memory further comprises a management area in which management information is stored, the management information used to manage the reference image data stored in the storage area, and
the motion controller generates the management information in accordance with the transfer-necessary area.

3. The image encoder of claim 2, wherein the management information comprises a tag indicating a starting point coordinate of the reference image data on the frame memory and size information indicating a size of the reference image data stored in the storage area.

4. The image encoder of claim 3, wherein the tag comprises a first tag and a second tag, the first tag indicating a first starting point coordinate on the frame memory, the second tag indicating a second starting point coordinate on the frame memory.

5. The image encoder of claim 2, wherein the motion controller specifies the ending point of a buffered area on the frame memory based on the management information.

6. The image encoder of claim 5, wherein the motion controller determines that the whole necessary area is the transfer-necessary area when the ending point coordinate of the necessary area is larger than the ending point coordinate of the buffered area and when the starting point coordinate of the necessary area is larger than the starting point coordinate of the buffered area.

7. The image encoder of claim 5, wherein the motion controller determines that an area between the starting point coordinate of the necessary area and the starting point coordinate of the buffered area and an area between the ending point of the buffered area and the ending point of the necessary area are the transfer-necessary area when the starting point coordinate of the necessary area is less than the starting point coordinate of the buffered area and when the ending point coordinate of the necessary area is equal to or larger than the ending point coordinate of the buffered area.

8. The image encoder of claim 5, wherein the motion controller determines that an area between the ending point coordinate of the buffered area and the starting point coordinate of the necessary area is the transfer-necessary area when the starting point coordinate of the necessary area is less than the starting point coordinate of the buffered area.

9. The image encoder of claim 5, wherein the motion controller determines that an area between the starting point coordinate of the necessary area and the starting point coordinate of the buffered area is the transfer-necessary area when the ending point coordinate of the necessary area is equal to or larger than the ending point coordinate of the buffered area.

10. The image encoder of claim 5, wherein the motion controller determines that the whole necessary area is the transfer-unnecessary area when the starting point coordinate and the ending point coordinate of the necessary area fall within the starting point coordinate and the ending point coordinate of the buffered area.

11. The image encoder of claim 1, further comprising:
a subtractor configured to subtract the prediction image data from the original image data and generates first residual image data;
an orthogonal transformer configured to perform an orthogonal transform of the first residual image data and generates first coefficient data;
a quantization module configured to quantize the first coefficient data and generates quantized data;
a coder configured to code the quantized data and generates coded data;
an inverse-quantization module configured to inversely quantize the quantized data and generates second coefficient data;
an inverse-orthogonal transformer configured to perform an inverse-orthogonal transform of the second coefficient data and generates second residual image data;
an adder configured to add the prediction image data to the second residual image data and generates locally-decoded image data; and
a deblocking filter configured to smooth a block boundary of the locally-decoded image data and generates the reference image data, wherein
the controller transfers the reference image data generated by the deblocking filter to the frame memory.

12. An image decoder configured to decode coded data using reference image data stored in a frame memory, the image decoder comprising:
a controller configured to generate control information comprising a starting point coordinate and an ending point coordinate of a necessary area in the reference image data stored in the frame memory;
a memory comprising a storage area in which at least part of the reference image data is stored;
a motion controller configured to determine whether the necessary area is a transfer-necessary area or a transfer-unnecessary area based on the control information, and transfer the reference image data of the transfer-necessary area from the frame memory to the storage area; and
a motion compensation module configured to generate prediction image data using the reference image data stored in the storage area.

13. The image decoder of claim 12, wherein the memory further comprises a management area in which management information is stored, the management information used to manage the reference image data stored in the storage area, and
the motion controller generates the management information in accordance with the transfer-necessary area.

14. The image decoder of claim 13, wherein the management information comprises a tag indicating a starting point coordinate of the reference image data on the frame memory and size information indicating a size of the reference image data stored in the storage area.

15. The image decoder of claim 14, wherein the tag comprises a first tag and a second tag, the first tag indicating a first starting point coordinate on the frame memory, the second tag indicating a second starting point coordinate on the frame memory.

16. The image decoder of claim 13, wherein the motion controller specifies the ending point of a buffered area on the frame memory based on the management information.

17. The image decoder of claim 16, wherein the motion controller determines that the whole necessary area is the transfer-necessary area when the ending point coordinate of the necessary area is larger than the ending point coordinate of the buffered area and when the starting point coordinate of the necessary area is larger than the starting point coordinate of the buffered area.

18. The image decoder of claim 16, wherein the motion controller determines that an area between the starting point coordinate of the necessary area and the starting point coordinate of the buffered area and an area between the ending point of the buffered area and the ending point of the necessary area are the transfer-necessary area when the starting point coordinate of the necessary area is less than the starting point coordinate of the buffered area and when the ending point coordinate of the necessary area is equal to or larger than the ending point coordinate of the buffered area.

19. The image decoder of claim 16, wherein the motion controller determines that an area between the ending point coordinate of the buffered area and the starting point coordinate of the necessary area is the transfer-necessary area when the starting point coordinate of the necessary area is less than the starting point coordinate of the buffered area.

20. A method for encoding original image data using a memory comprising a storage area in which at least part of reference image data stored in a frame memory is stored, the method comprising:
   generating control information comprising a starting point coordinate and an ending point coordinate of a necessary area in the reference image data stored in the frame memory;
   determining whether the necessary area is a transfer-necessary area or a transfer-unnecessary area based on the control information;
   transferring the reference image data of the transfer-necessary area from the frame memory to the storage area; and
   generating prediction image data using the reference image data stored in the storage area.

* * * * *